United States Patent [19]

Dorsch

[11] Patent Number: 4,518,543
[45] Date of Patent: May 21, 1985

[54] DEVICE FOR THE DOSED DIFFUSION OF GASES IN LIQUIDS

[75] Inventor: Dieter Dorsch, Heilbronn, Fed. Rep. of Germany

[73] Assignee: Günter Grittmann, Eppingen-Muhlbach, Fed. Rep. of Germany

[21] Appl. No.: 540,904

[22] Filed: Oct. 12, 1983

Related U.S. Application Data

[63] Continuation of Ser. No. 289,111, Jul. 31, 1981, abandoned.

[51] Int. Cl.³ .................................................. B01F 3/04
[52] U.S. Cl. ........................ 261/64 B; 137/859; 210/169; 210/221.2; 251/63.6; 261/119 R; 261/123
[58] Field of Search .............. 261/64 B, 64 R, 77, 261/121 R, 122–124, 119 R, DIG. 7; 251/62, 63.6; 209/169, 170; 119/3, 5; 210/169, 221.2; 43/56, 57; 137/510, 852, 859, 624.14

[56] References Cited

U.S. PATENT DOCUMENTS

| 390,562 | 10/1888 | Brunler | 261/DIG. 7 |
| 1,338,592 | 4/1920 | Sanford | 261/64 B |
| 1,500,283 | 7/1924 | Stinson | 261/64 B |
| 2,483,426 | 10/1949 | Moore | 261/64 B |
| 2,514,463 | 7/1950 | Bayers, Jr. | 261/124 X |
| 2,577,389 | 12/1951 | Warriner | 261/124 X |
| 2,586,499 | 2/1952 | Anderson | 261/124 X |
| 2,631,020 | 3/1953 | Malir, Jr. | 261/124 X |
| 3,506,541 | 4/1970 | Snelling | 261/123 X |
| 3,592,450 | 7/1971 | Rippon | 261/123 |
| 3,911,068 | 10/1975 | Hamilton | 210/169 X |
| 4,034,030 | 7/1977 | Bracey | 261/119 R X |
| 4,105,725 | 8/1978 | Ross | 261/64 B X |
| 4,152,379 | 5/1979 | Suhr | 261/64 R X |
| 4,172,009 | 10/1979 | Simon et al. | 261/123 X |
| 4,248,707 | 2/1981 | Granger | 261/124 X |

*Primary Examiner*—Richard L. Chiesa
*Attorney, Agent, or Firm*—Fidelman, Wolffe & Waldron

[57] ABSTRACT

A device is described, which is intended for the dosed diffusion of gases in liquids and which is used especially for small-scale application in the field of aquaria. The device consists essentially of a diffusor which can be filled with gas via an inlet device and round which liquid circulates and which is open in its lower region and is filled via an automatically regulating pressure-regulating valve.

10 Claims, 2 Drawing Figures

DEVICE FOR THE DOSED DIFFUSION OF GASES IN LIQUIDS

This application is a continuation of application Ser. No. 289,111, filed July 31, 1981.

BACKGROUND OF THE INVENTION

The invention relates to a device for the dosed diffusion of gases in liquids, consisting of a diffusor which can be filled with gas via an inlet device and round which liquid circulates.

Diffusion devices of the type mentioned are used, for example, in chemical process engineering and for water treatment. They conventionally consist of a cylindrical diffusor round which liquid circulates and which is filled with the desired gas via an inlet device. In this way, an interface via which the gas diffuses into the liquid is formed in the diffusor.

A preferred embodiment of such devices is aimed at a small-scale application in the field of aquaria, where the problem arises, above all, of a dosed enrichment of the aquarium water with carbon dioxide ($CO_2$). In addition to a function as a plant nutrient, carbon dioxide acts in the aquarium water as a chemical equilibrium component in the bicarbonate/carbonic acid system, the optimum establishment of which is of great importance for the biotope of the aquarium. The demand for free carbon dioxide depends on the water volume of the aquarium and on the amount of plant mass occupying it, on the type and intensity of the lighting influencing the assimilation process and on the natural proportion of chemical equilibrium carbonic acid (carbonate hardness). The establishment of a supply of $CO_2$ can be checked by measuring the pH value of the water.

A known device for the diffusion of $CO_2$ in aquaria consists of a diffusion cylinder which is mounted in a vertical position against the inner wall of the aquarium by means of a suction-cup system, for example two suction cups attached laterally. The upper end face of the diffusion cylinder is designed as a diffusion diaphragm, via which the gas dissolves directly into the water. For this purpose, the diaphragm must be completely covered with water and be located preferably at a height of approximately 4 cm below the water level. The diffusion cylinder is filled via a hose connection piece moulded onto the cylinder casing near the diaphragm. During the filling operation, water standing in the diffusion cylinder is displaced by $CO_2$ over-pressure. Provided for this purpose in the end face lying opposite the diaphragm is a bottom orifice, through which water flows, even during the gradual diffusion loss of $CO_2$, in a pressure equilibrium. To check the filling level, the diffusion cylinder is made of glass or a transparent plastic. Filling is carried out by hand, in portions, by means of a regulating valve in which a $CO_2$ cartridge is accommodated. Such a diffusion cylinder has to be filled up manually with $CO_2$ at least once a day.

A diffusion device of this type has a series of disadvantages. On the one hand, the size of the diffusion diaphragm is predetermined owing to the construction, so that the diffusion rate can be adapted to the actual $CO_2$ requirement only by means of a complicated parallel connection of several diffusion cylinders. Adaptation to a varying $CO_2$ requirement requires expensive and disturbing modifications in the aquarium. Furthermore, according to the findings of the present invention, the diffusion operation is at its most effective at a high pressure acting on the boundary layer between the gas and liquid. In the known embodiment, however, the diffusion diaphragm is located near the water surface, that is to say, precisely in the region of the lowest water pressure. Measurements on the known diffusion cylinder gave the surprising result that at least a part of the $CO_2$ diffusion takes place not via the diaphragm, but via the pressure-stabilised gas/water boundary layer at the bottom of the gas column. Finally, the manual filling of the diffusion device according to the state of the art regularly requires the attention of an attendant. However, an outlay of this type is hardly acceptable for commercial breeding aquaria and for decorative aquaria in business premises and restaurants. Filling of the diffusion cylinder by hand will always be accompanied by extreme variations in the level and occasional irregularities which have an adverse effect on the constancy of the $CO_2$ diffusion rate.

SUMMARY OF THE INVENTION

The object of the invention is to provide a device of the type mentioned in the introduction, which can be handled conveniently and easily and is easily adjustable and in which the diffusion rate can be varied over a wide range without modifications and can consequently be adapted dynamically to changing requirements.

This object is achieved by means of a diffusor which is open in its lower region and which can be filled with gas via an automatically regulating pressureregulating valve.

Advantageous embodiments of the device according to the invention are characterised by the features set out in the claims appended hereto.

The device according to the invention does away with a costly diffusion diaphragm which, in addition, in the biologically active environment of an aquarium is constantly in danger of being clogged by suspended particles and plant growth and has to be cleaned regularly. The shaping according to the invention of the diffusor makes it possible to fix the size of the effective diffusion interface between the gas and liquid by presetting a mean regulating gas pressure. It can therefore be adjusted by preselecting a mean gas pressure, and the gas pressure can be stabilised automatically round the preselected average value by means of a pressure-regulating or pressure-reducing valve. For this purpose, the shape of the diffusor can be varied within wide limits according to the desired range of adjustment. After the adjustment has been made, the desired pressure is kept constant over a long period of time by means of small regulating deflections. The automatic mechanism according to the invention for the self-filling of the diffusor permits, for the first time, a pressure regulation with a control stroke of ±10 mb. The diffusor designed in this way can be placed on the bottom of an aquarium, in such a way that the gas outflow orifice is located near the bottom. This has the advantage that the $CO_2$ is supplied in the root region of any plants present, which has a favourable effect on their growth.

BRIEF DESCRIPTION OF THE INVENTION

The invention is explained in more detail with reference to an exemplary embodiment illustrated in the drawings in which:

FIG. 1 shows a cross-sectional side view of a diffusor according to the invention; and FIG. 2 shows an enlarged cross-sectional view in an axial direction of an especially advantageous pressure-regulating valve connected in front of the diffusor.

DETAILED DESCRIPTION OF THE DRAWINGS

Figure 1:
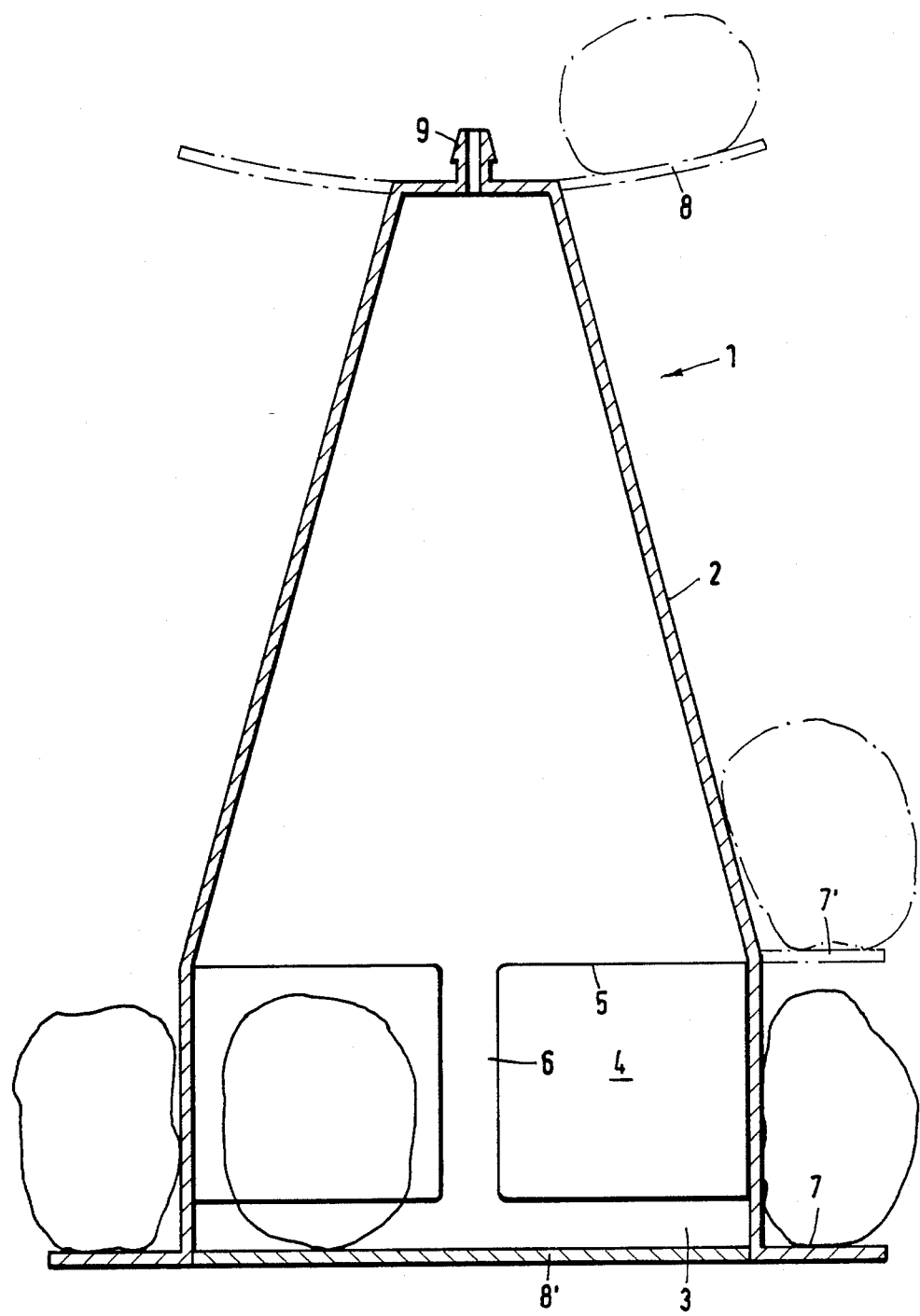

The diffusor 1 is a hollow body open in its lower region. Its shaping depends, in particular, on the desired variation in the effective diffusion interface with the set regulating gas pressure. FIG. 1 shows an embodiment with a contour which widens conically downwards and in which an increase in the regulating pressure therefore takes place when the diffusion interface is enlarged. The diffusor 1 is preferably placed on the bottom of a vessel of liquid, for example an aquarium (not shown).

In the exemplary embodiment illustrated, a cylindrical end piece 3 perforated with large-area recesses 4 is moulded onto the conical part 2 of the diffusor 1 for this purpose. The interior of the diffusor 1 communicates with the surrounding liquid via these recesses 4. The top edge 5 of the recesses 4 limits the maximum gas level in the diffusor 1. The outer surface of the end piece 3 between the recesses 4 constitutes a series of feet 6 which guarantees a sufficient distance between the bottom of the vessel of liquid (not shown) and the line of the maximum level in the diffusor 1 and, consequently, an unobstructed exchange of liquid. Instead of the recesses 4 in the cylindrical end piece 3, notches, supporting cams, etc. (not shown) can also be provided at the lower margin of the diffusor 1.

The fixing or anchoring of the diffusor 1 on the bottom of the vessel is made easier, for applications in the field of aquaria, by means of the conical shaping illustrated. Thus, the diffusor 1 can be tilted in a simple way between stones laid laterally against it and can, as a result, also be hidden. To support weighting material, the end piece 3 of the diffusor 1 near the bottom can be provided with a continuous or interrupted projection 7 resembling a flange. Alternatively or additionally, further projections 7' can be formed on the outer casing of the diffusor 1, and the top side of the diffusor 1 can be designed as a supporting face, for example in the form of a supporting plate 8. In an especially advantageous embodiment, the diffusor 1 is closed on its underside with a releasably inserted or glued-in cover 8', so that weighting material can also be introduced into the interior of the diffusor 1.

Formed on the top side of the diffusor 1 is a projecting connection piece 9 which permits the inflow of gas into the interior of the diffusor 1. A hose (not shown) leading to the discharge side of the pressure-regulating valve is pushed onto the projecting connection piece 9. The diffusor 1 is preferably made in one piece of glass or a transparent or translucent plastic.

Figure 2:
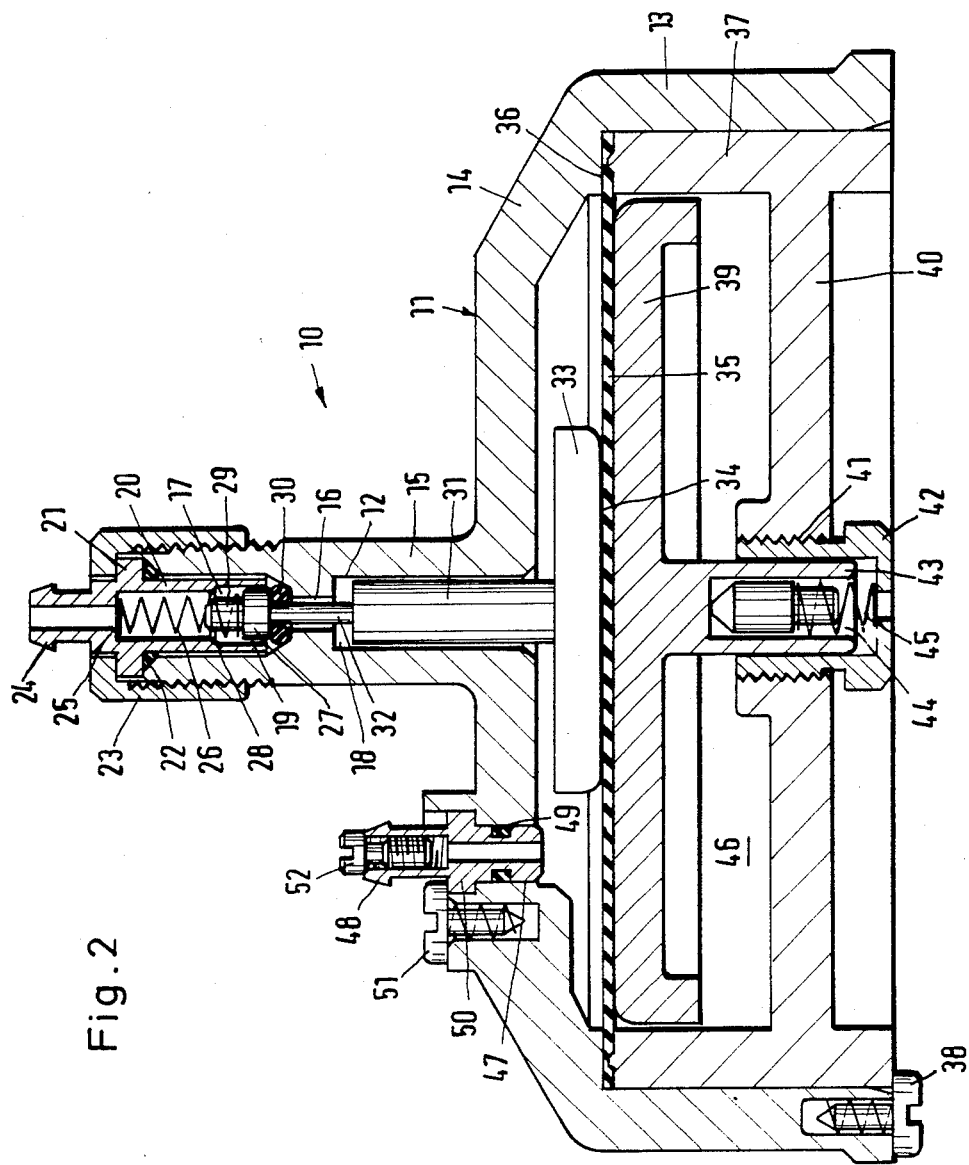

The functioning parts of the pressure-regulating valve 10 (FIG. 2) are mounted in a housing 11. This is an axially symmetrical shaped part open on the end face, with a continuous axial bore 12 having a stepped diameter. The housing 11 consists of a wide base cylinder 13 and of a conically tapering section 14 which is moulded onto the latter and which merges, in turn, into a cylindrical housing projection 15 having a comparatively small diameter. The axial bore 12 in the housing projection 15 is narrowed at approximately half its height by a radial contraction 16 dividing the interior of the housing projection 15 into two chambers 17 and 18 of approximately equal size. The outer chamber 17 assigned to the free end of the housing projection 15 receives a spring-loaded small valve 19 and is subjected to the gas pressure on the supply side. On the other hand, the inner chamber 18 belongs to the regulating-pressure region of the pressure-regulating valve 10. The control movement of all the components of this pressure-regulating valve 10 takes place in the axial direction of the housing 11.

The small valve 19 consists of an axially perforated sleeve 20 open at both ends, which can be inserted coaxially to fit into the outer chamber 17 of the housing projection 15. The sleeve 20 rests with a radially outwardly projecting flange 21 in a leaktight manner on the end face of the housing projection 15. An O-ring 22 which is pushed onto the sleeve 20 against the flange 21 and which is pressed into a conical portion at the end of the axial bore 12 of the housing 11 serves as a seal. The pressing force is provided by a union nut 23 which rests in a sliding manner on the rear side of the flange 21 and which is screwed onto an external thread on the housing projection 15.

Moulded, in an axial prolongation, in one piece onto the sleeve 20 is a projecting connection piece 24 which, when the sleeve 20 is assembled, projects beyond the union nut 23 and permits the pushing-on of a hose (not shown) leading to the pressure source, for example a $CO_2$ cartridge. The clear width of the projecting connection piece 24 is narrowed in relation to the sleeve 20. The narrowing point 25 constitutes the abutment for a compression spring 26 located in the interior of the sleeve 20. This compression spring 26 works against a valve head 27 which is guided in the interior of the sleeve 20 and is mounted axially movably. The axial play of movement is limited by a step 28 in the wall of the sleeve 20. The compression spring 26 is pushed onto a peg 29 moulded onto the valve head 27. As a result of the prestress of the compression spring 26, the valve head 27 lies against a sealing ring 30 in a leak-tight manner. The supply-pressure region of the pressure-regulating valve is thereby shut off from the regulating-pressure part. The sealing ring 30 is mounted in a lead-tight seat on the contraction 16 separating the chambers 17, 18 of the housing projection 15. The internal dimension of the sealing ring 30 corresponds approximately to the clear width of the contraction 16.

The valve head 27 is lifted out of its sealing position from the regulating-pressure side of the pressure-regulating valve. This purpose is served by a mushroom-shaped thrust member 31, the cylindrical shank of which slides axially in the inner chamber 18 of the housing projection 15. Located on the end face of the shank is a tappet 32 which passes through the contraction 16 of the housing projection 15 and the central orifice of the sealing ring 30 resting thereon. The tappet 32 acts operatively against the valve head 27, against which it rests loosely. The mushroom-shaped thrust member 31 rests loosely on the elastic diaphragm 35 which shuts off the regulating-pressure part of the pressure-regulating valve 10 in a lead-tight manner. The diaphragm 35 consists of a round diaphragm disc which is retained at its peripheral margin from the one side by a shoulder 36 on the inner wall of the housing 11 and from the other side by a retaining ring 37. The diaphragm 35 forms the base of the conical housing section 14 and lies approximately flat in the closing position of the small valve 19. The thrust plate 33 of the mushroom-shaped thrust member 31 covers the central region of the diaphragm 35 and is movable in the axial direction in the interior of the conical housing section limited by the diaphragm.

The play of movement of the mushroom-shaped thrust member 31 corresponds at least to the control stroke of the small valve 19.

The diaphragm 35 is mounted in a pressure-tight manner between the retaining ring 37 and the housing 11. The retaining ring 37 is a fitting part corresponding to the internal dimension of the base cylinder 13. It is inserted coaxially into the base cylinder 13 from the side of the housing lying opposite the housing projection 15, is pressed against the elastic diaphragm 35 and is locked in the sealing position by one or more selftapping screws 38.

The external-air side of the diaphragm 35 is loaded by a piston 39 which covers approximately the entire face of the diaphragm 35 with the exception of a free region in the vicinity of the margin. The piston 39 is spring-loaded and mounted movably in an axial direction. For this purpose, an intermediate plate 40 offset inwards from below in relation to the supporting face of the pressure-regulating valve 10 is drawn into the retaining ring 37. This intermediate plate 40 is provided with a central axial threaded bore 41 into which an adjusting bush 42 is screwed. The piston rod 43 of the piston 39 loading the diaphragm 35 is retained and guided in the adjusting bush 42 with an axial sliding play. Provided in the piston rod 43 is an axial blind bore 44 into which is inserted a compression spring 45 acting against the bottom of the adjusting bush 42. The screw-in depth of the adjusting bush 42 thus determines the force with which the piston 39 presses against the diaphragm 35.

The chamber 46 formed by the casing and the intermediate plate 40 of the retaining ring 37 and the diaphragm 35 is connected to the external air by the thread turns of the adjusting bush 42. Pressure compensation is thereby guaranteed sufficiently.

Finally, a gas outlet is located laterally on the housing 11 of the pressure-regulating valve 10. For this purpose, in the embodiment illustrated, a bore 47 meeting the regulating-pressure region of the valve is guided through the wall of the housing 11. Inserted from outside the bore 47 is a hose connection piece 48, the wall of which has in the lower region a continuous circular groove for receiving a sealing ring 49 and in the upper region a retaining collar 50. The hose connection piece 48 is pushed into the bore 47 in a leak-tight manner and is locked against the housing 11 on the retaining collar 50 by means of a self-tapping screw 51. The end of the hose connection piece 48 which is widened in the form of an olive for holding the hose is provided with a thread into which a reducing screw 52 is screwed from outside. The gas stream flows out essentially through the thread turns of the reducing screw 52 and is thereby strongly throttled. The reducing screw 52 can be provided, according to requirements, with one or more knurled indentations at right angles to the thread turns and can accordingly present less flow resistance.

The function of the pressure-regulating valve 10 according to the invention is characterised by an equilibrium of forces at the valve head 27 which has to be lifted out of its leak-tight seat against the pressure prevailing on the gas inlet side and against the prestress of the compression spring 26. In the interests of a low actuating force, the face of the valve head 27 subjected to pressure on the inlet side must be minimum, for this purpose, and actuation of the valve head 27 must take place with as little friction as possible. The actuating force required is transmitted by the spring-loaded piston 39 via the elastic diaphragm 35 to the mushroom-shaped thrust member 31 which acts with the tappet 32 on the valve head 27. Until the regulating pressure falls below a nominal value determined by the spring prestress of the piston 39, this actuating force is compensated by the regulating pressure acting on the large-area diaphragm 35, and the valve head 27 remains in the sealing position. The nominal value is preselected on the adjusting bush 42. After the valve head 27 has been lifted off, a sufficient pressure increase must result in the regulating-pressure region to close the gas inlet again. For this purpose, the outflow of gas from the regulating-pressure region is prevented by strong throttling.

Because of the possibility of pressure regulation in the low-pressure range with tolerances of approximately $\pm 10$ mb, a precise regulation of the level in the diffusor according to the invention is provided. Constructional features of the pressure-regulating valve which are material to the invention are the use of a low-friction small valve on the gas inlet side, the use of a large-area elastic diaphragm in the regulating-pressure region and a strong reduction of the gas stream in the outlet.

The pressure-regulating valve according to the invention is designed for a supply pressure of between 100 mb and 2 b. In the exemplary embodiment illustrated, the gas is supplied to the pressure-regulating valve via a hose connection piece. Pressure reducers, reducing valves and/or expansion chambers (none of these shown), which may be necessary and are connected separately upstream of the pressure-regulating valve can, of course, also be connected in one piece to the pressure-regulating valve. Securing of the pressure regulating valve and gas supply container may be accomplished by the use of any suitable means. The valve and gas supply means may be either in or outside the liquid vessel; however, due to the ease of adjustment and/or gas supply replenishment when the valve and gas supply arre situated outside the liquid vessel or at least above the water level, such arrangement is most preferred.

I claim:

1. A device for dosed diffusion of gases in liquids, particularly for application in the field of aquaria, consisting of a hollow body diffusor, a gas inlet at the upper portion of said diffusor, said inlet connected to an automatically regulating pressure-regulating valve, said valve blocked on the supply-pressure side by a valve smaller than said pressure-regulating valve operable by means of an actuating member subjected to the regulating pressure and to an adjustable prestress, said smaller valve consisting of a valve head loaded by means of a compression spring and axially movable against a sealing ring, said valve head lifted out of its leak-tight seat by means of a tappet, one end of said tappet directed to said valve head, a mushroom-shaped thrust member mounted on the opposite end of and movable with said tappet, said thrust member resting on an elastic disc-shaped diaphragm shutting off in a leak-tight manner the regulating-pressure region of said pressure-regulating valve.

2. In an aquarium system having means associated therewith for the automatic diffusion of carbon dioxide into a body of water contained within, said aquarium consisting of a vessel adapted to retain a body of water, said water in communication with the surrounding atmosphere, the improvement which consists of:
   carbon dioxide diffusion means consisting of
   a hollow body diffusion contained within said vessel, the lower portion of said diffusor near or at the bottom of said vessel and communicating with water in said vessel by means of at least one opening at or near the bottom of said diffusor, and the upper portion thereof connected to a carbon dioxide inlet means connected to an automatically-regulating pressure-regulating valve situated between a source of carbon dioxide and said diffusion body and connected operably thereto, said pressure-regulating valve adjustable to provide a selected diffusion rate of said carbon dioxide into said water and means to supply said carbon dioxide to said pressure-regulating valve, said pressure-regulating valve blocked on the supply-pressure side by a small valve smaller than said pressure-regulating valve operable by means of an actuating member subjected to the regulating pressure and to an adjustable prestress, said smaller valve consisting of a valve head loaded by a compression spring and axially movable against a sealing ring, said smaller valve liftable from a leak-tight seat by means of a tappet, one end of said tappet being directed to said valve head, a mushroom-shaped thrust member mounted on the opposite end of and movable with said tappet, said thrust member resting on an elastic disc-shaped diaphragm, said diaphragm shutting off in a leak-tight manner the regulating pressure region of said pressure-regulating valve.

3. Device according to claim 2 wherein said hollow body of said diffusor widens conically downwards.

4. Device according to claim 2 wherein said valve contains a gas stream reduction means at the discharge means thereof.

5. A device as defined by claim 4 wherein said diffusion is perforated with large-area recesses at or near the bottom thereof and provided with a continuous or interrupted flange at the bottom thereof.

6. A device as defined by claim 4 wherein the bottom of said diffusor is provided with a covering means.

7. A device as defined by claim 4 wherein the outer side of said diaphragm, facing away from said thrust member is subjectable to a definite force by means of an axially movable piston.

8. A device as defined by claim 7 wherein the valve head, thrust member and piston are guided movably in the axial direction of a housing encasing the pressure-regulating valve and the diaphragm is retained in its peripheral margin by means of a shoulder on the inner wall of said housing.

9. A device as defined by claim 8 wherein said diaphragm is pressed in a leak-tight manner against said shoulder by means of a retaining ring insertable into said housing, and an intermediate plate having a central threaded bore for receiving an adjusting bush, forming the abutment for a piston rod of said piston loading said diaphragm onto said retaining ring.

10. A device as defined by claim 9 wherein said piston rod is retained in said adjusting bush with a blind bore into which is inserted a compression spring acting against said adjusting bush, said piston rod having an axial play of movement.

* * * * *